*Inventor:*
EDWIN T. LORIG,
by: Donald G. Dalton
his Attorney.

Patented Dec. 23, 1952

2,622,448

UNITED STATES PATENT OFFICE 2,622,448

APPARATUS FOR AUTOMATICALLY CENTERING AND ALIGNING MOVING OBJECTS

Edwin T. Lorig, Pittsburgh, Pa., assignor to United States Steel Company, a corporation of New Jersey Application June 4, 1951, Serial No. 229,722

4 Claims. (Cl. 74—241)

This invention relates to apparatus for automatically centering and aligning moving objects, especially strip and strip-like materials. In the processing of metal strip, the strip is conveyed over rolls in the uncoiled condition. When the strip is conveyed over a roll to the processing equipment it is likely that the strip will be fed at a slight angle to the roll. Because of this, the strip will work its way across the face of the roll. In addition, the camber and/or lateral curvature which is present in the finished strip due to rolling difficulties causes the strip edges and longitudinal center line to approach the roll at an angle, this also causing the strip to move across the face of the roll. In order to keep the strip in the desired path of travel, various expedients have been resorted to. One of the most common is the use of stationary or rotatable side guides against which the edges of the strip bear. In some instances side guides have been used in conjunction with looper pits to force the strip back on the desired center line. The use of abnormally high strip tension has also been tried in an attempt to keep the strip aligned. Another method of operation is to periodically slip or slue the strip back into its approximate proper position on the conveying roll. All of the above methods of centering strip tend to abrade and mutilate the strip edges and in some instances cause the edges of the strip to be stretched beyond the elastic limit of the metal. Diagonal or lateral surface scratches are also formed on finely finished flat products of all kinds, these scratches being detrimental to subsequent operations and together with edge damage result in the scrapping of a large percentage of the material being processed. The problems discussed above also exist in belt conveyors and drive belts used in conjunction with belt pulleys. If the belt is made of rubber or other relatively soft material, it is more easily damaged. In addition to the methods of aligning strip mentioned above, crown rolls have been used to center materials having a low modulus of elasticity such as textiles, rubber and composition belts.

Various types of apparatus suitable for centering and aligning strip are shown in my copending applications entitled "Apparatus for Positioning Strip," Serial No. 97,218, filed June 4, 1949, now Patent No. 2,593,157, "Method and Apparatus for Positioning Strip," Serial No. 138,389, filed January 13, 1950, now Patent No. 2,592,581, and "Method and Apparatus for Positioning Strip," Serial No. 145,648, filed February 23, 1950, now Patent No. 2,593,158.

It is an object of the present invention to provide apparatus for automatically centering moving objects without damage thereto.

This and other objects will be more apparent after referring to the following description and attached drawings, in which.

Figure 1:
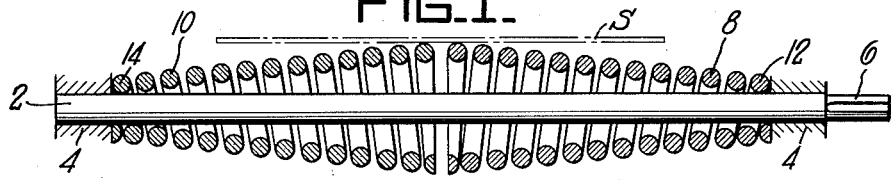
Figure 1 is a sectional view of one embodiment of my invention with no load applied thereto.
Figure 2:
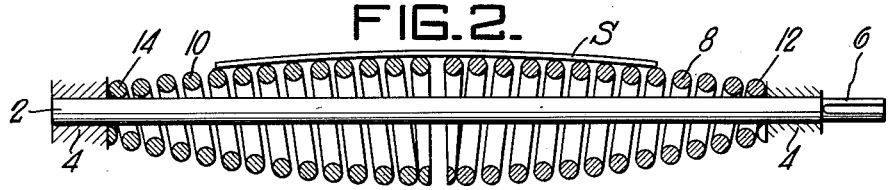
Figure 2 is a view similar to Figure 1, but showing a load applied thereto.
Figure 3:
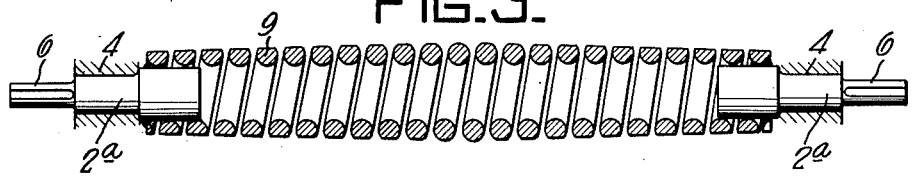
Figure 3 is a view, similar to Figure 1, showing a second embodiment of my invention.

Referring more particularly to Figures 1 and 2 of the drawings, the reference numeral 2 indicates a rotatable shaft mounted in bearings 4. The shaft 2 may be either idle or driven, in which latter case an extension 6 is provided at one end for connection to a driving mechanism (not shown). A pair of opposed spirally wound springs 8 and 10 surround the shaft 2 with their outer ends rigidly secured to the shaft at points 12 and 14 adjacent the bearings 4. The springs 8 and 10 are preferably frusto-conical in shape with the large diameter ends adjacent each other so that the adjacent ends of the springs can move inwardly toward the axis of the shaft 2. However, the outside diameter of the springs may be made larger at their adjacent ends than at their outer ends by grinding off material from the outer surface of the spring as shown in Figure 3. It will be understood that the conical effect is greatly exaggerated for the purpose of illustration and that the strip S will normally be flat instead of convex as shown in Figure 2.

When pressure is applied to the surface of the springs 8 and 10 by means of a strip S, the rotating rims of the springs move inwardly toward their axes to the point of contact and outwardly at a point diametrically opposite. The rotation of the springs under pressure applied by the strip S will continue in a tilted manner as shown in Figure 2 as long as pressure is applied by the strip. If the strip S is in centered position and its bearing pressure on the springs is uniform over its full width no lateral movement of the strip will occur. However, when the strip is off-center or the strip contact is non-uniform from side to side the spring having the greatest total amount of tension and pressure applied thereto will produce a greater lateral pressure on the strip than the other spring so that the strip S will be forced to centered position. In certain applications there will be only line contact between the roll and the object passing thereover and in other instances the strip S may be wrapped around an arc of the spring.

In the embodiment of my invention shown in Figure 3 a spring 9 of uniform inside diameter is mounted on stub shafts 2ᵃ and part of the outside surfaces of the coils are ground off to give the desired frusto-conical shape. The operation in this case is the same as that described above. The spring 9 is in effect a pair of springs connected at their adjacent ends to cause them to rotate in unison, this being necessary for proper functioning of the apparatus. The centering device of Figure 3 is especially suitable for centering a troughed conveyor belt.

Figure 4:
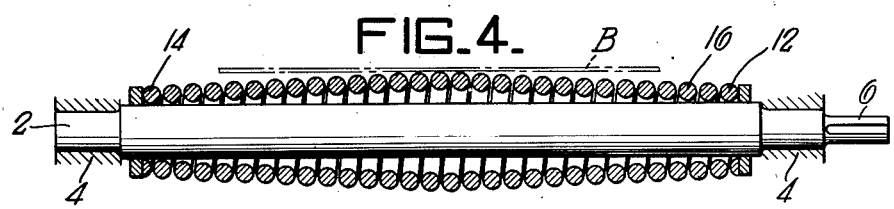
Figure 4 is a view, similar to Figure 1, showing a third embodiment of my invention.
Figure 5:
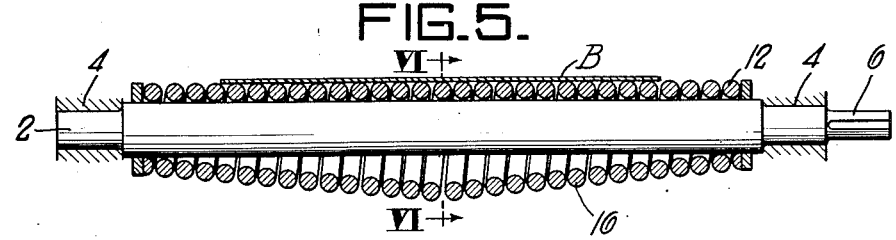
Figure 5 is a view, similar to Figure 4, but showing a load applied thereto.
Figure 6:
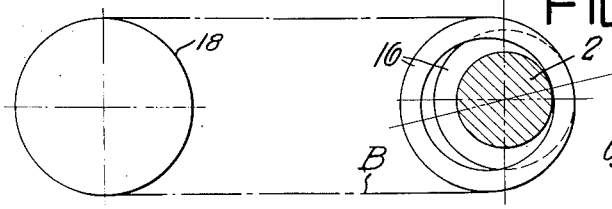
Figure 6 is a schematic view taken on the line VI—VI of Figure 5.

Figures 4 to 6 show an embodiment of my invention which incorporates features of each of the first two embodiments. In this embodiment the two coil springs 8 and 10 are connected at their centers as shown so that in effect there is a single coil spring 16. Figure 4 shows this roll or spring without any load being applied thereto. Figure 5 shows a load being applied to the spring 16 by means of an endless belt B. The endless belt B also passes around a conventional pulley 18 spaced from the spring 16 as shown in Figure 6. It will be seen that the convolutions of the spring 16 are forced against the shaft 2 by means of the belt B which surrounds the spring over an arc of approximately 180°. The operation of this embodiment is the same as that set forth above for the first embodiment.

While several embodiments of my invention have been shown and described it will be apparent that other adaptations and modifications may be made without departing from the scope of the following claims.

I claim:

1. In combination with an endless belt and a pulley around which the belt passes, a rotatable belt supporting member for automatically centering the belt comprising a pair of spaced bearings, a shaft section rotatably mounted in each of said bearings, a pair of axially opposed rotatable spirally wound springs forming a supporting surface for said belt, said springs being coaxial, the outside diameter of each of said springs progressively increasing in size from their outer ends to their adjacent ends, the arrangement and spacing of the coils being such that each spring may flex in a direction transverse to its longitudinal axis and about its end of smaller diameter as a pivot, means connecting the outer end of one of said springs to the first of said shaft sections, means connecting the outer end of the other of said springs to the second of said shaft sections, and means for positively causing the springs to rotate in unison.

2. In combination with an endless belt and a pulley around which the belt passes, a rotatable belt supporting member for automatically centering the belt comprising a pair of spaced bearings, a shaft section rotatably mounted in each of said bearings, a pair of axially opposed rotatable spirally wound springs forming a supporting surface for said belt, said springs being coaxial, the outside diameter of each of said springs progressively increasing in size from their outer ends to their adjacent ends, the arrangement and spacing of the coils being such that each spring may flex in a direction transverse to its longitudinal axis and about its end of smaller diameter as a pivot, means connecting the outer end of one of said springs to the first of said shaft sections, means connecting the outer end of the other of said springs to the second of said shaft sections, means for positively causing the springs to rotate in unison, and means for connecting the adjacent ends of said springs.

3. In combination with an endless belt and a pulley around which the belt passes, a rotatable belt supporting member for automatically centering the belt comprising a pair of spaced bearings, a pair of axially opposed rotatable spirally wound springs forming a supporting surface for said belt, said springs being coaxial, the outside diameter of each of said springs progressively increasing in size from their outer ends to their adjacent ends, the arrangement and spacing of the coils being such that each spring may flex in a direction transverse to its longitudinal axis and about its end of smaller diameter as a pivot, a rotatable shaft extending axially through said springs and supported in said bearings, and means for attaching the outer ends of said springs to said shaft, the internal diameter of the central coils of said springs being greater than the diameter of said shaft.

4. In combination with an endless belt and a pulley around which the belt passes, a rotatable belt supporting member for automatically centering the belt comprising a pair of spaced bearings, a pair of axially opposed rotatable spirally wound springs forming a supporting surface for said belt, said springs being coaxial, the outside diameter of each of said springs progressively increasing in size from their outer ends to their adjacent ends, the arrangement and spacing of the coils being such that each spring may flex in a direction transverse to its longitudinal axis and about its end of smaller diameter as a pivot, a rotatable shaft extending axially through said springs and supported in said bearings, means for attaching the outer ends of said springs to said shaft, the internal diameter of the central coils of said springs being greater than the diameter of said shaft, and means for connecting the adjacent ends of said springs.

EDWIN T. LORIG.

REFERENCES CITED

The following references are of record in the file of this patent:

UNITED STATES PATENTS

| Number | Name | Date |
|---|---|---|
| 331,328 | Randall | Dec. 1, 1885 |
| 563,651 | Brooks | July 7, 1896 |
| 774,699 | Sagerdahl | Nov. 8, 1904 |
| 2,391,178 | McKnight | Dec. 18, 1945 |

FOREIGN PATENTS

| Number | Country | Date |
|---|---|---|
| 19,403 | Great Britain | Sept. 9, 1893 |